United States Patent [19]

Pompe

[11] Patent Number: 5,098,623
[45] Date of Patent: Mar. 24, 1992

[54] METHOD FOR PRODUCING CERAMIC COMPOSITE MATERIALS CONTAINING SILICON OXYNITRIDE AND ZIRCONIUM OXIDE

[75] Inventor: Robert Pompe, Mölndal, Sweden

[73] Assignee: Svenska Keraminstitutet, Goteborg, Sweden

[21] Appl. No.: 438,416

[22] PCT Filed: May 31, 1988

[86] PCT No.: PCT/SE88/00296
§ 371 Date: Nov. 16, 1989
§ 102(e) Date: Nov. 16, 1989

[87] PCT Pub. No.: WO88/09778
PCT Pub. Date: Dec. 15, 1988

[30] Foreign Application Priority Data

Jun. 1, 1987 [SE] Sweden ............................. 8702268

[51] Int. Cl.$^5$ ............................................. C04B 35/58
[52] U.S. Cl. ............................................. 264/65; 501/97; 501/98
[58] Field of Search ......................... 264/65; 501/97, 98

[56] References Cited

U.S. PATENT DOCUMENTS 3,839,540  10/1974  Arrol et al. ..................... 501/97
4,069,059  1/1978  McDonough ..................... 501/97

OTHER PUBLICATIONS

M. B. Trigg et al., Proc. Int. Symp. Ceramic Comp. for Engines, 1983, pp. 199-207, Japan.
Rice et al., Progr. Rep. NRL, Dec. 1979, pp. 18-20.

*Primary Examiner*—James Derrington
*Attorney, Agent, or Firm*—Brooks & Kushman

[57] ABSTRACT

A new group of ceramic composite materials containing silicon oxynitride ($Si_2N_2O$, O'-phase) and zirconium oxide ($ZrO_2$) can be prepared using a thermal reaction between zirconium silicate ($ZrSiO_4$) and silicon nitride powder ($Si_3N_4$) supplied completely or partly as silicon powder (Si) which is nitrided to $Si_3N_4$ in a nitrogen-containing atmosphere. By adding aluminium oxide or the like, composite compositions with $ZrO_2$, O'-phase and sialons (silicon aluminium oxynitrides) as main components can be obtained. In the method according to this invention, the raw powder material is prepared, e.g. by concurrent milling and blending to submicron particle size, formed by known technique into a compact, nitrided and sintered to the desired density in nitrogen-containing atmosphere.

11 Claims, No Drawings

METHOD FOR PRODUCING CERAMIC COMPOSITE MATERIALS CONTAINING SILICON OXYNITRIDE AND ZIRCONIUM OXIDE

The present invention relates to a method for producing ceramic composite materials containing silicon oxynitride and zirconium oxide, starting from ceramic powder materials containing silicon and/or silicon nitride powder and zirconium silicate powder In the method of preparation, use is made of a high-temperature reaction between silicon nitride and zirconium silicate which are reacted to form silicon oxynitride and zirconium oxide in connection with the sintering of compacts to the desired density.

Composite materials containing silicon oxynitride and zirconium oxide according to this invention should primarily be considered to belong to the group of high-performance ceramics which are distinguished inter alia by high strength, fracture toughness, wear, corrosion and thermal shock resistance also at high temperatures. However, advanced applications in the refractory field are also conceivable for this type of composite materials. An increase and extension of the use of the above-mentioned composite materials is however affected/hampered to a significant extent by the relatively high costs for the powder raw material and the costs for so-called sintering aids, which must be supplied to achieve the desired sintering qualities and qualities of the material. This applies especially to rare earth metal oxides. Another limiting factor is the need for an advanced furnace equipment to be able to sinter powder compacts to the desired density. The generally high degree of shrinkage in connection with sintering (densification) is another process engineering drawback. For composites containing true non-oxidic components, such as silicon nitride, there is often the additional problem of chemical incompatibility with respect to zirconium oxide which may result in the formation of secondary phases, such as zirconium nitride or zirconium oxynitride, which have an adverse effect on the thermomechanical properties. By using the method according to this invention, several of the above-mentioned drawbacks will be overcome in a composite material where the raw material powder consists to an essential part of $ZrSiO_4$ and Si powder of a particle size substantially within the submicron range. As will be described further on, such a powder mixture can be obtained by concurrent milling and blending of the components, and the cost of this powder mixture is estimated at about one tenth of the current cost. The amount of necessary sintering aids from the group of rare earth oxides can be reduced by half at the same time as the sintering temperature can be below about 1650° C., which thus makes it possible to use a more conventional furnace equipment. Further, the linear shrinkage in connection with sintering (densification) to almost full density can also be minimized to about 12% or less because of the increase of the internal volume on account of nitridation of Si to $Si_3N_4$ and the reaction between $ZrSiO_4$ and $Si_3N_4$ to $ZrO_2$ and $Si_2N_2O$. By the nitridation step, a bond is also produced in the material, resulting in fully sufficient strength to permit machining the nitrided material, if desired, before the final sintering step. After completed sintering, the included main components $ZrO_2$ and $Si_2N_2O$ will exhibit good compatibility with respect to the formation of undesirable secondary phases. In the scientific/technical literature, $ZrSiO_4$ and $Si_2N_2O$ materials are described separately and do not seem to have been tested as components in a composite material However, $ZrSiO_4$ is mentioned by Rice et al (Refs. 1,2) as a desirable grain boundary phase in connection with the sintering of $Si_3N_4$. This is so because of its high liquids temperature, high E-modulus and low thermal expansion coefficient. The latter two properties are close to those of $Si_3N_4$, but also for the so-called sialons ($\beta'$-phase) or $Si_2N_2O$ (O'-phase), such as represented in the known compatibility diagram $Si_3N_4$—$SiO_2$—AlN—$Al_2O_3$ (Ref. 3). However, the literature is silent on the use of a reaction between $ZrSiO_4$ and $Si_3N_4$ and/or the component combination $ZrO_2/Si_2N_2O$ in these contexts.

As mentioned in the introduction to this specification, the method for producing composite materials according to the present invention relies on a reaction between $ZrSiO_4$ and $Si_3N_4$, supplied completely or partly as Si, to give $ZrO_2$ and $Si_2N_2O$. The following text describes the essential process steps of this method and the properties of the material obtained thereby, the method being thereafter illustrated by an Example.

The starting raw material in the preparation of the composite material according to this invention should exclusively consist of $ZrSiO_4$ and Si and/or $Si/Si_3N_4$ powder for optimum utilisation of the reaction giving $ZrO_2$ and $Si_2N_2O$. Depending on the desired applications of the composite material where priority is given e.g. to such properties as high strength, low thermal conductivity or the like, an excess of either component may however be supplied. Similarly, the content of components resulting from the reaction, i.e. $ZrO_2$ and $Si_2N_2O$, can be altered by separate addition of any of the substances to affect the properties of the composite material as desired. In this context, an increased addition of Si and/or $Si_3N_4$ should especially be noted for obtaining a composite in the $Si_2N_2O/Si_3N_4$ range (Ref. 3) or an increased addition of Si and/or $Si_3N_4$, combined with an adequate amount of $Al_2O_3$, for obtaining a composite material in the $\beta'$-phase/O'-phase range within the phase diagram earlier mentioned. In addition to the components appearing within the system of $ZrSiO_4$—$Si_3N_4$—$Si_2N_2O$—$ZrO_2$, other components may be used as well (e.g. silicon carbide, aluminium nitride etc.) for affecting the thermomechanical, electrical or other properties of the composite material produced.

In the use of conventional (pressureless) sintering, sintering aids must be supplied. The sintering aids can be selected from those which are known e.g. in the sintering of $Si_3N_4$ and sialons. Oxides, such as $Al_2O_3$, MgO, BaO etc. or oxides of rare earth metals, can thus be used. The amount added depends on the desired sintering properties or properties of the final composite. If a sintering technique with the application of mechanical pressure is used (gas overpressure sintering, hot pressing, HIP), sintering aids can be dispensed with or their content reduced. In order to completely or partly stabilize the formed $ZrO_2$ in its tetragonal form and, thus, use the strengthening effect obtained by martensitic transformation of the tetragonal form into the monoclinic one according to known principles for high-performance $ZrO_2$ materials/composites, one or more of the known oxidic stabilizers, such as $Y_2O_3$, MgO, CaO, $CeO_2$ etc., should be used. Since the monoclinic/tetragonal transformation is also linked with the size of the $ZrO_2$ grains in the composite matrix, the addition of oxidic stabilizers can be avoided by adequate powder preparation according to known principles. The same applies, i.e. no addition of stabilizer, if the strengthening mechanism by micro-cracking in connection with spontaneous tetragonal/monoclinic phase transition of the $ZrO_2$ grains is utilized.

In addition to the $ZrSiO_4$ powder and other components as stated above, the starting material may consist of Si powder or a mixture of $Si_3N_4$ and Si powder. These powders should have submicron size for preparing high-performance composite materials of fine-grained microstructure, while for refractory applications a coarser particle size, i.e. an average particle size of above 1 μm, can be used. The desired particle size of the starting powder material can be obtained by blending separately obtained powders or by concurrent milling and blending in a suitable milling equipment. It has then been found that if submicron $ZrSiO_4$ powder is milled together with Si powder having a particle size substantially exceeding 1 μm, a submicron $ZrSiO_4$/Si powder mixture can be obtained, the specific surface of the concurrently milled and blended powders becoming larger than if each powder is milled separately. A similar synergistic milling effect is thus obtained as disclosed in Swedish Patent Application SE 8103269-0 for submicron $Si_3N_4$ powder and Si powder as above. However, milling Si powder together with $ZrSiO_4$ powder of a particle size of above 1 μm is not unlikely to give a submicron powder mixture.

The sintering aids/stabilizers, if any, are supplied in connection with the concurrent milling and blending of the main components, but can also be added by impregnation or in any other adequate manner after the concurrently milled and blended powder material has been formed by known methods, such as slip casting, injection molding, pressing, extrusion, stamping etc., into a compact of the desired shape. After burning-off any process aids supplied in connection with the forming operation, the nitridation step takes place where the added Si powder is reacted in a nitrogen-containing atmosphere to form $Si_3N_4$. To avoid overheating in connection with the exothermal nitridation reaction, the nitridation step should be carried out with a slow temperature increase or, for instance, according to a two-step program with the first temperature level at 1000°–1300° C. and the final nitridation temperature at 1150°–1450° C. Generally, the final nitridation temperature should be below the lowest eutectic temperature for the optionally present sintering aids/stabilizers/main components, since the presence of a melt is likely to accelerate the exothermal reaction between $ZrSiO_4$ and $Si_3N_4$ to form $ZrO_2$ and $Si_2N_2O$. If submicron Si powder is included, a complete reaction into nitride can normally occur at a final nitridation temperature of 1250°–1300° C. and a holding time of 1–3 hours. If, for particular reasons, it is however desirable to use the released reaction heat in connection with nitridation and the exothermal reaction between $ZrSiO_4$ and $Si_3N_4$, the process may optionally be performed adiabatically, such that also partial or complete sintering (densification) can be obtained in connection with nitridation and reaction of $ZrSiO_4$ and $Si_3N_4$ into $ZrO_2$ and $Si_2N_2O$.

In conventional (pressureless) sintering, the temperature should be below about 1750° C. to minimize the decomposition of the formed $Si_2N_2O$ into SiO and $N_2$ gas. A nitrogen-containing atmosphere should be used. The powder bed technique according to known principles should be used where the powder bed used, e.g. preoxidized $Si_3N_4$ powder, $SiO_2$/$Si_3N_4$ powder mixture, $Si_2N_2O$ powder or the like, produces the same type of gaseous decomposition products as the sintered compact. Further, the temperature should be maintained preferably below 1650° C. to minimize grain growth, especially grain growth of the formed $ZrO_2$ in the composite matrix. Heat treatment as a separate step or as a part of the sintering program can be used to completely or partly crystallize the grain boundary glass phase formed after cooling into crystalline phases and, thus, to optimize the high-temperature strength, corrosion resistance and other related properties of the composite. Normally, the reaction of $ZrSiO_4$/$Si_3N_4$ into $ZrO_2$/$Si_2N_2O$ occurs in connection with sintering and is accompanied by a molar volume increase of about 9%. When using sintering methods with mechanical pressure, the pressure must thus be applied after the reaction is substantially completed.

The method for producing the composite material according to this invention will be illustrated in more detail by the following Example:

Two batches of $ZrSiO_4$ powder (Ventron, BET specific area: 12.8 $m^2$/g, purity: 99.98%) and Si powder (KemaNord, BET specific area: 2.1 $m^2$/g, purity: 99.8%) with an addition (in per cent by weight) of 9% $Y_2O_3$/5% $Al_2O_3$ and 3% $Y_2O_3$/4% $Al_2O_3$, respectively (batches 1 and 2, respectively) as stabilizer/sintering aid were used in this Example (the added stabilizer of course also assists as sintering aid), to illustrate the effect of varying amounts of stabilizer/sintering aid. The quantity ratio of $ZrSiO_4$ to Si was the stoichiometric one for the reaction. Powder preparation was effected by concurrently milling and blending the components in a ball mill in plastic containers with $Si_3N_4$ milling balls for about 70 hours in ethanol as milling liquid. The thus prepared slurries were wet-sieved through a 10 μm screen, whereupon the liquid phase was removed in a rotating evaporator. Measurement of the BET specific area yielded 14–21 $m^2$/g, indicating that it would have been easier to mill the added Si powder to submicron size by concurrent milling and blending. When separately milling Si powder, a specific area of not more than 8–11 $m^2$/g is normally obtained. The resulting dried powder mixture was screen-granulated, pre-pressed uniaxially into rectangular bars and was cold isostatically pressed at 280 MPa. The resulting green density was about 55% of the theoretical one. Nitridation of the compacts was carried out in a graphite resistance furnace or a thermobalance in nitrogen gas atmosphere at a pressure of 0.1 MPa. The following two-step program was used (temperature/holding time): 1150° C./0.5 hours–1250° C./1.5 hours. For the sample size used (7×7×40 mm), this program resulted in a complete reaction of Si without any overheating effects. Minor shrinkage (linear) of about 1–1.3% was obtained after nitridation, and the green density was 67–68% of the theoretical one. X-ray diffraction analysis of nitrided material indicated the presence of $ZrSiO_4$ and $Si_3N_4$ (alpha phase). Sintering was carried out in a graphite resistance furnace with the samples embedded in preoxidized silicon nitride powder (preoxidation: 1200° C./0.5 hours) in nitrogen gas at 0.1 MPa. In the sintering programs used, temperature was 1600°–1640° C. with a holding time of 1–4 hours. At a temperature above 1670° C., a certain decomposition took place in this case, resulting in increased open porosity Samples from batches 1 and 2 densified to about 99% and 95%, respectively, of the theoretical density. Because of the uncertainty about the relative amounts/exact composition of the phases formed after sintering, the theoretical density may deviate slightly from the compact density. Phase analysis by means of X-ray diffraction showed that a reaction into $ZrO_2$ and $Si_2N_2O$ had occurred during sintering. The $ZrO_2$ formed appeared as tetragonal/cubic phase and monoclinic/tetragonal (cubic) phase, respectively, in batches 1 and 2. The ratio of monoclinic to tetragonal (cubic) phase in batch 2 was estimated at about 1:5. On account of coinciding tetragonal/cubic reflexes, it was not possible to make an exact quantity calculation of the phases included. The microstructure which was examined by means of a scanning electron microscope in a polished cross-sectional surface showed the presence of small, oblong $Si_2N_2O$ grains (about 1 μm long) surrounded by a glass phase as well as $ZrO_2$ grains of a size of about 0.5–2 μm. These grains were homogenously distributed in the $Si_2N_2O$ matrix.

LITERATURE REFERENCES

1. Rice et al, Progr. Rep. NRL, December 1974, p. 18
2. Rice e.t al, J. Am. Ceram. Soc. 58(5–6) (1975), p 264
3. M.B. Trigg, K.H. Jack, Proc. Int. Symp. Ceramic Comp. for Engines, 1983, Japan, p. 199

I claim:

1. A method for producing ceramic composite materials containing silicon oxynitride ($Si_2N_2O$, O'-phase) and zirconium oxide ($ZrO_2$), starting from pulverulent raw materials, nitrided in a nitrogen-containing atmosphere and sintered to the desired density, characterized in that the raw material powder contains zirconium silicate ($ZrSiO_4$) and silicon powder (Si) or $ZrSiO_4$ and a mixture of Si and $Si_3N_4$ powder, and optionally a stabilizing oxide for forming tetragonal/cubic $ZrO_2$ and/or a sintering aid which, after powder preparation and forming, is reacted to form $ZrO_2$ and $Si_2N_2O$(O'-phase) in connection with nitridation of Si into $Si_3N_4$ and sintering.

2. Method as claimed in claim 1, characterized in that the amount of added $ZrSiO_4$ and Si supplied completely or partly as Si powder which is subsequently reacted by nitridation into $Si_3 N_4$, is the stoichiometric amount for reaction into $ZrO_2$ and $Si_2N_2O$(O'-phase) as main components in the composite material produced.

3. Method as claimed in claim 1 or 2, characterized in that the amount of added Si powder supplied completely or partly as Si powder subsequently reacted by nitridation into $Si_3/N_4$, varies within the composition range of $Si_3N_4$, $Si_2N_2O$ and $ZrO_2$ as main components in the composite material produced.

4. Method as claimed in claim 3, wherein aluminum oxide ($AlO_2$) is added in an amount corresponding to the formation of $Si_2N_2O$ (O'-phase), $ZrO_2$ and a sialon (silicon aluminum oxynitride) as main components in the composite material produced.

5. Method as claimed in claims 1 or 2, characterized in that a sintering aid is added, selected from the group consisting of $Al_2O_3$, MgO, BaO or oxides of rare earth metals.

6. Method as claimed in claim 1 characterized in that oxides stabilizing the tetragonal and/or cubic form of $ZrO_2$ are added which oxides are selected from the group consisting of $Y_2O_3$, MgO, CaO, $CeO_2$ and others, either separately or in admixture.

7. Method as claimed in claims 1 or 2, characterized in that the raw material powder is prepared by blending and/or concurrent milling and blending of the powder components included to a submicron particle size, starting from powder materials from the main components, $ZrSiO_4$ and Si or $ZrSiO_4$, Si and $Si_3N_4$ have submicron particle size or at least one of them is within the submicron particle size range.

8. Method as claimed in claim 1, characterized in that the powder raw material is formed by methods selected from the group consisting of slip casting, injection molding, and extrusion into a compact and is nitrided in a nitrogen-containing atmosphere at a maximum temperature below the lowest eutectic temperature for the phases present/formed.

9. Method as claimed in claim 8, characterized in that nitridation is carried out in the presence of a melt formed by phase reaction between the components present.

10. Method as claimed in claim 9, characterized in that nitridation is carried out in a two-step program with the first temperature level at 1000°–1300° C. and the second level at 1150°1450° C.

11. A method as claimed in claim 10 characterized in that sintering is carried out in a powder bed in a nitrogen-containing atmosphere at a temperature below 1750° C. in the absence of mechanical pressure.

* * * * *